United States Patent [19]

Yamashita et al.

[11] Patent Number: 4,996,683
[45] Date of Patent: Feb. 26, 1991

[54] OPTICAL TRANSMISSION DEVICE

[76] Inventors: Tsuyoshi Yamashita, Nagoya; Goro Kobayashi, Okazaki; Hisanori Nakamura; Youichi Shibata, both of Toyota; Toshihiro Mori, Takatsuki, all of Japan

[21] Appl. No.: 420,373

[22] Filed: Oct. 12, 1989

[30] Foreign Application Priority Data

Oct. 13, 1988 [JP] Japan .................. 63-258139
Dec. 12, 1988 [JP] Japan .................. 63-313153

[51] Int. Cl.$^5$ ........................................... H04B 10/02
[52] U.S. Cl. .................................... 370/4; 370/13; 370/24
[58] Field of Search ............... 370/1, 4, 24, 26, 29, 370/32, 17, 13, 13.1; 455/601, 606, 607; 371/20.1, 20.2

[56] References Cited

U.S. PATENT DOCUMENTS

| | | | |
|---|---|---|---|
| 4,288,869 | 9/1981 | Kolodzey et al. | 370/4 |
| 4,641,378 | 2/1987 | McConnell et al. | 455/618 |
| 4,881,220 | 11/1989 | Yomogida et al. | 370/13 |

FOREIGN PATENT DOCUMENTS

| | | |
|---|---|---|
| 59-72254 | 4/1984 | Japan . |
| 59-72255 | 4/1984 | Japan . |
| 60-130 | 1/1985 | Japan . |
| 60-12834 | 1/1985 | Japan . |
| 60-76830 | 5/1985 | Japan . |
| 60-248037 | 12/1985 | Japan . |
| 61-107248 | 7/1986 | Japan . |
| 63-54032 | 3/1988 | Japan . |
| 63-236137 | 10/1988 | Japan . |

Primary Examiner—Douglas W. Olms
Assistant Examiner—Melvin Marcelo
Attorney, Agent, or Firm—Oblon, Spivak, McClelland, Maier & Neustadt

[57] ABSTRACT

An optical transmission device for interconnecting an optical full duplex transmission line and a half duplex transmission line. When a start bit of a data block of an electrical signal received from the half duplex transmission line is detected, a maintaining signal to maintain the same transmission direction is generated during which the data block can be transmitted. An optical signal is received from the optical full duplex transmission line and converted into an electrical signal. Similarly, a maintaining signal to maintain the same transmission direction is generated. In response to either one of the two maintaining signals, passage or stopping of signals by a driver for sending out an electrical signal to the half duplex transmission line and a receiver for receiving an electrical signal from the half duplex-transmission line are controlled. Possible interference of data is prevented and the transmission direction is changed over in this manner. Further, the level of an optical signal is monitored, and when the optical signal level becomes lower than a reference level, an abnormality warning data is transmitted succeeding to the data block.

11 Claims, 7 Drawing Sheets

OPTICAL TRANSMISSION DEVICE

BACKGROUND OF THE INVENTION

This invention relates to an optical transmission device for transmitting data between different apparatus having communication functions such as a sequence controller or a computer. More specifically, the present invention relates to a transmission controller interposed between a full duplex optical transmission line and a half duplex electrical transmission line.

Conventionally, a communication system is known wherein sequence controllers or computers disposed at various machining stations in a factory are connected to a communication line to effect mutual communications between them. In such communication system, mutual communications between the machining stations or between a control center and the individual machining stations are carried out. When transmission or reception of data is carried out at each of the machining stations, data interchange is sometimes carried out with optical coupling in order to eliminate a disturbance by noises or to facilitate transmission and reception of data to and from a moving body.

In such a communication system, an optical transmission line (including a spatial transmission line) exists in a part of the communication line. However, since the optical transmission line is constituted from a full duplex transmission line, any other electrical transmission line to be connected with the optical transmission line must necessarily be a full duplex electrical transmission line.

Meanwhile, data transmission between the different stations or between the control center and each of the stations can be sufficiently made by a half duplex transmission line due to an amount of data to be transmitted thereby. Accordingly, employment of the full duplex transmission line will make a waste of wires and may increase failures of breaking of wires or short-circuiting.

On the other hand, the optical transmission device interposed between the electrical transmission line and the optical transmission line includes a light emitting device for converting an electric signal into an optical signal, and a light receiving device for changing an optical signal into an electric signal. In such a device, dust, oil or the like may stick to a surface of an output window of the light emitting device or an input window of the light receiving device to deteriorate the optical transmittivity of the window. And also the optical axes of the light emitting device and the light receiving device may be brought out of alignment with each other. Consequently, accurate transmission of data may not be assured. In order to detect such an abnormal condition as described just above, the level of the optical signal (amount of light) received by the light receiving device is monitored. When the optical signal level becomes lower than a stable operation assuring level, a warning signal output is given. Such warning signal is transmitted also to the control center so that a warning lamp of the center may be switched on in response to the signal. To this end, a dedicated signal line for transmitting a warning signal must be provided between each machining station and the control center.

SUMMARY OF THE INVENTION

Accordingly, it is an object of the present invention to provide an optical transmission device which enables interconnection of a half duplex electrical transmission line and a full duplex optical transmission line.

It is another object of the present invention to provide an optical transmission device which enables data interchange between a half duplex transmission line and a full duplex transmission line.

It is a further object of the present invention to save wires and reduce failures arising from wires by means of half duplex transmission lines for connecting individual machining stations to each other.

It is a still further object of the present invention to provide an optical transmission device which enables, in addition to normal transmission of data, transmission of an abnormality signal which denotes a drop of the optical signal level, using a half duplex transmission line.

It is an additional object of the present invention to enable transmission of an abnormality signal which denotes a drop of the optical signal level using a half duplex transmission line to eliminate dedicated wires for such abnormality signal and improve the efficiency in utilization of the equipment.

An optical transmission device of the present invention is interposed between a half duplex electrical transmission line and a full duplex optical transmission line to control the direction of transmission. An electrical signal propagated over the half duplex transmission line is received by a receiver. The electrical signal received by the receiver is first modulated and then changed ihto an optical signal which is then transmitted to the optical full duplex transmission line. On the other hand, an optical signal propagated over the full duplex optical transmission line is received by the present optical transmission device. The optical signal is converted here into an electrical signal, which is then demodulated and transmitted to the half duplex electrical transmission line by way of a driver.

In order to control the transmission direction, a start bit of a data block of an electrical signal received by the receiver is detected. A maintaining signal to maintain the same transmission direction is generated for a predetermined period of time during which at least the data block can be transmitted after detection of the start bit. On the other hand, when a start bit of a data block of an optical signal received from the full duplex optical transmission line is detected, a maintaining signal to maintain the same transmission direction is generated for a predetermined period of time during which at least the data block can be transmitted after detection of the start bit.

Then, in response to one of such two maintaining signals, passage or stopping of signals by the driver and the receiver is controlled to effect control of the transmission direction such that the transmission direction may be maintained to a fixed direction only for the period of time during which transmission of a data block is enabled.

According to another aspect of the present invention, a signal level of an optical signal received from the full duplex optical transmission line is detected by an optical level detecting circuit, and in case the optical signal level is lower than a reference level, an optical level abnormality signal output is given. Further, a start bit of a data block of the received optical signal is detected, and a maintaining signal to maintain the same transmission direction is generated for a predetermined period of time during which at least the data block and an abnormality command to be sent succeeding to the data block can be transmitted after detection of the start bit.

Further, a timing signal is generated which represents a transmission enabling period for the abnormality command after transmission of the data block. Then, when an optical level abnormality signal output is given, warning data is transmitted in synchronism with the timing signal to the half duplex transmission line by way of the driver. The abnormality signal representative of an abnormal condition of the optical signal level is transmitted together with the data block in this manner.

DESCRIPTION OF THE INVENTION

In the following, the present invention will be described in connection with preferred embodiments thereof.

Figure 3:
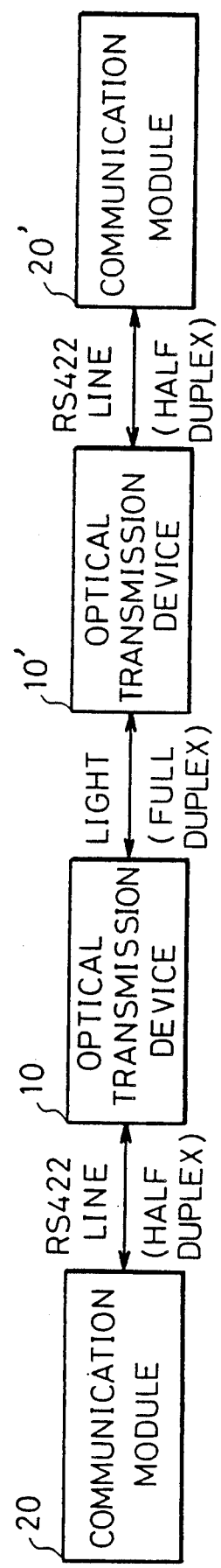
FIG. 3 is a block diagram showing an entire system including the optical transmission device of FIG. 1 and associated transmission lines.

An optical transmission device of the present invention may be used in such a communication system as shown in FIG. 3. Referring to FIG. 3, a communication module 20 and an optical transmission device 10 are coupled to each other by way of an RS422 electrical transmission line (hereinafter referred to as "RS422 line") of the RS422 (balanced operation type transmission circuit) Standards. The electrical transmission line is here a half duplex transmission line over which data cannot be transmitted in the opposite directions at the same time. Meanwhile, the optical transmission device 10 and another optical transmission device 10' are coupled to each other by way of an optical transmission line (spatial optical path). The optical transmission line is a full duplex transmission line over which data can be transmitted in the opposite directions at the same time. In the communicating system, the communication module 20 and another communication module 20' can transmit data with each other by way of the RS422 line, optical transmission device 10, optical transmission line, optical transmission device 10' and RS422 line.

Figure 1:
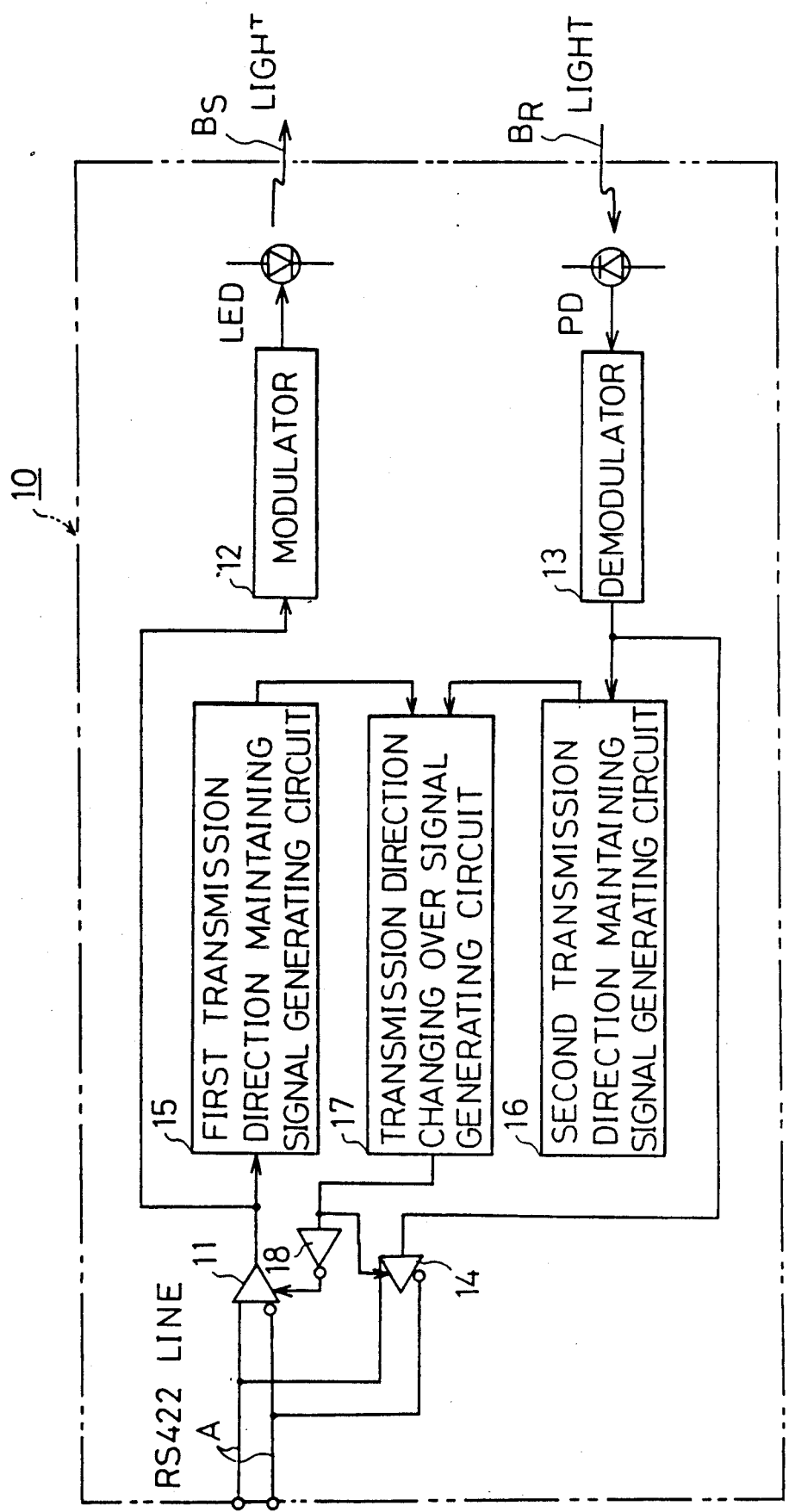
FIG. 1 is a block diagram showing construction of an optical transmission device according to a preferred embodiment of the present invention.

Referring now to FIG. 1 which shows construction of the optical transmission device 10 of FIG. 3, sending and reception of data are carried out over the RS422 line of the half duplex type. Meanwhile, the full duplex optical transmission line has two transmission lines including a dedicated sending line and a dedicated receiving line that are constructed from space optical paths. The RS422 line may be hereinafter referred to as transmission line A, and the dedicated sending and receiving lines of the optical transmission line may be referred to as transmission lines $B_S$ and $B_R$, respectively. Data can thus be transmitted in two directions including a direction from the transmission line A to the transmission line $B_S$ and another direction from the transmission line $B_R$ to the transmission line A.

The optical transmission device 10 includes a receiver 11 in the form of an RS422 communication circuit coupled to the RS422 line. A modulator 12 for modulating an optical signal and a first transmission direction maintaining signal generating circuit 15 are connected to the receiver 11. The first transmission direction maintaining signal generating circuit 15 detects a start bit of a data block of an output signal from the receiver 11 and generates a maintaining signal to maintain the receiver 11 in a signal passage enabling condition for a predetermined period of time during which at least the data block can be transmitted (period of time of the data block).

Figure 4:
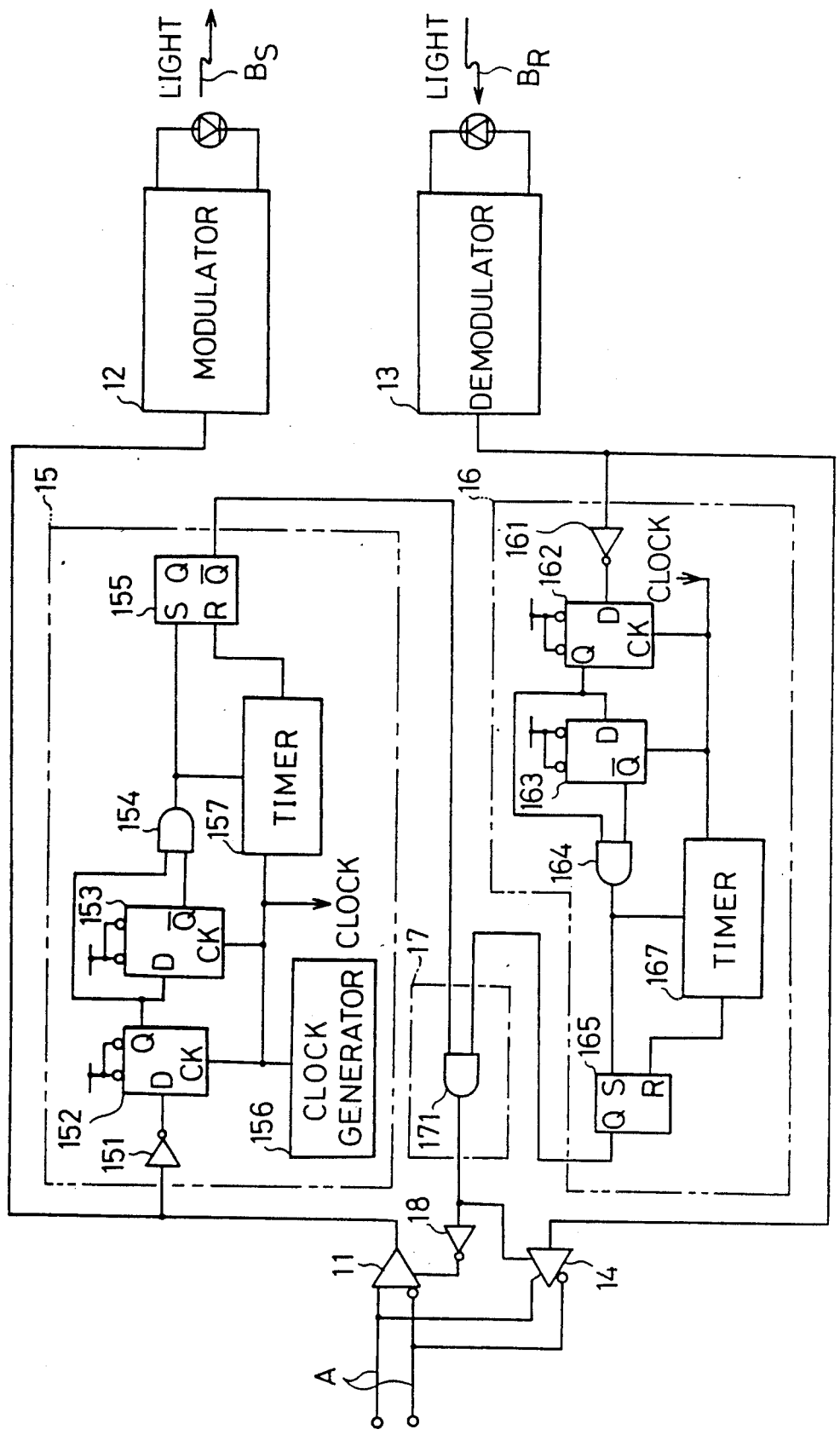
FIG. 4 is a detailed circuit diagram of the optical transmission device of FIG. 1.

Details of the first transmission direction maintaining signal generating circuit 15 are shown in FIG. 4. Referring to FIG. 4, an output of an invertor 151 is coupled to a D-type flip-flop circuit 152, and a Q-terminal output of the D-type flip-flop circuit 152 is coupled to a succeeding D-type flip-flop circuit 153. A $\overline{Q}$-terminal output of the D-type flip-flop circuit 153 and the Q-terminal output of the D-type flip-flop circuit 152 are coupled to an AND gate 154. An output of the AND gate 154 is coupled to an RS-type flip-flop circuit 155 and a timer 157. A timing for latching at the D-type flip-flop circuits 152 and 153 is provided by a clock signal given from a clock generator 156. Meanwhile, the timer 157 starts its counting operation when the output of the AND gate 154 changes to a high level (hereinafter referred to as H level) from a low level (hereinafter referred to as L level). When a predetermined interval of time elapses, the timer 157 resets the RS-type flip-flop circuit 155. An output of the RS-type flip-flop 155 is coupled to another AND gate 171 which constitutes a transmission direction changing over signal generating circuit 17 also shown in FIG. 1.

Referring back to FIG. 1, an output of the modulator 12 is connected to a light emitting diode LED, and an optical signal given from the light emitting diode LED is sent into the transmission line $B_S$.

On the other hand, an optical signal transmitted over the transmission line $B_R$ is received by a photodiode PD and converted into an electric signal by the photodiode PD. The electric signal is coupled to a demodulator 13 and demodulated into another electric signal by the demodulator 13. An output of the demodulator 13 is coupled to a driver 14 and another transmission direction maintaining signal generating circuit 16. The driver 14 is provided to transmit an electrical signal to the transmission line A. Meanwhile, the second transmission direction maintaining signal generating circuit 16 detects a start bit in a data block of an output signal from the demodulator 13 and generates a maintaining signal to maintain the driver 14 in a signal passage enabling condition for a predetermined period of time during which at least the data block can be transmitted.

Details of the second transmission direction maintaining signal generating circuit 16 are also shown in FIG. 4. As seen in FIG. 4, the second transmission direction maintaining signal generating circuit 16 has a similar construction to that of the first transmission direction maintaining signal generating circuit 15 but is only different in that an invertor 161 is connected to receive an output signal of the demodulator 13.

The transmission direction changing over signal generating circuit 17 are connected to receive signals from the first and second transmission direction maintaining signal generating circuits 15 and 16 and give a control signal in accordance with a predetermined logic to a control terminal of the driver 14 and the invertor 18. An output of the invertor 18 is coupled to a control terminal of the receiver 11. In response to a level of the control signal given from the transmission direction changing over signal generating circuit 17, either the receiver 11 is put into a signal passage enabling condition and the driver 14 is put into a signal passage disabling condition or on the contrary the receiver 11 is put into a signal passage disabling condition and the driver 14 is put into a signal passage enabling condition.

Figure 2:
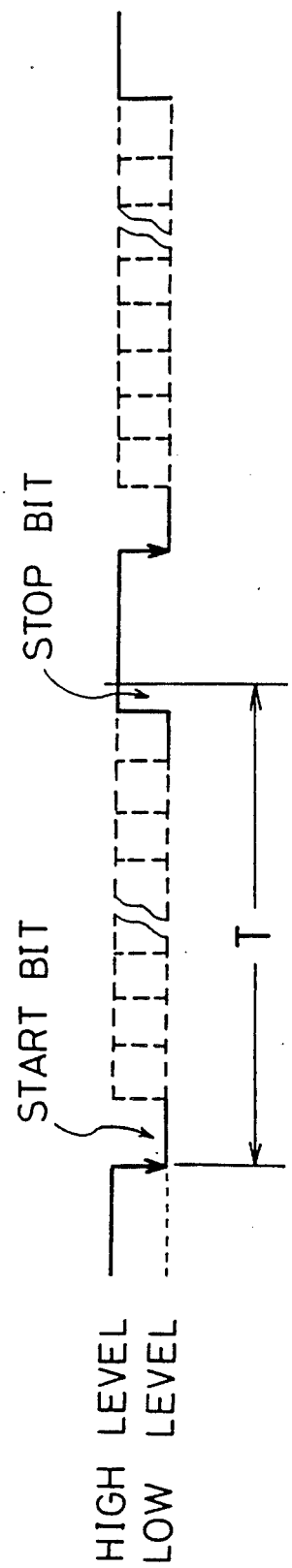
FIG. 2 is a diagram showing a data block of an electrical signal to be transmitted by the optical transmission device of FIG. 1.

The output of the receiver 11 normally presents, in a no-signal condition, the H level as shown in FIG. 2. A data block changes from the H level to the L level and has, after then, a start bit consisting of two bits of the L level. The data block normally terminates with a stop bit of the H level.

The time T from the beginning of the start bit to the stop bit is a transmission duration of a data block (data length in time). The level maintaining periods of time of maintaining signals given from the first transmission direction maintaining signal generating circuit 15 and the second transmission direction maintaining signal generating circuit 16 are a little longer than the duration T. The periods of time are set by means of built-in timers.

Subsequently, operation of the optical transmission device will be described.

After the power is made available to the optical transmission device 10, the optical transmission device stands by in a condition wherein it can transmit data from either one of the transmission line A and the transmission line $B_R$. Initial states of the RS-type flip-flop circuits 155 and 165 are reset states. Accordingly, the Q-terminal output of the RS flip-flop 165 presents the L level, and consequently the output of the AND gate 171 presents the L level. As a result, the driver 14 remains in an inoperative condition. On the other hand, since the output signal of the invertor 18 presents the H level, the receiver 11 is in an operative condition. Accordingly, presence or absence of an electrical signal on the transmission line A side can be monitored by the first transmission direction maintaining signal generating circuit 15. Meanwhile, presence or absence of an optical signal on the transmission line $B_R$ side is always monitored by the second transmission direction maintaining signal generating circuit 16.

Subsequently, in case an electrical signal is received from the transmission line A side, such an electrical signal as shown in FIG. 2 is transmitted to the D-type flip-flop circuit 152 by way of the invertor 151 because the receiver 11 remains in an operative condition. The requirement with which the output of the AND gate 154 is changed to the H level is that the Q-terminal output of the D-type flip-flop circuit 152 and the $\overline{Q}$-terminal output of the D-type flip-flop circuit 153 both present the H level. Since the D-type flip-flop circuits 152 and 153 form a 2-position shift register, if the output signal level of the receiver 11 changes from the H level to the L level, then the requirement is satisfied. In particular, when a start bit is detected, the output of the AND gate 154 is changed from the L level to the H level. Consequently, the timer 157 starts its counting operation while the RS-type flip-flop 155 is set. Accordingly, the $\overline{Q}$-terminal output of the RS-type flip-flop circuit 155 is changed from the H level to the L level, and the output of the AND gate 171 maintains the L level irrespective of an output level of the second transmission direction maintaining signal generating circuit 16.

The timer 157 resets the RS-type flip-flop circuit 155 after the transmission time T of a data block elapses. Consequently, the output signal from the $\overline{Q}$-terminal of the RS-type flip-flop 155 is changed back to the H level of the initial state. The H level of the $\overline{Q}$-terminal output of the RS-type flip-flop circuit 155 makes an enabling signal for enabling the change of the transmission direction in accordance with the Q-terminal output of the RS-thpe flip-flop circuit 165. To the contrary, the L level of the $\overline{Q}$-terminal output of the RS-type flip-flop circuit 155 makes a maintaining signal for maintaining the initial transmission direction in which the receiver 11a is active. Accordingly, at least during the transmission time T of a data block, the receiver 11 maintains an operative condition while the driver 14 maintains an inoperative condition, and the output signal of the receiver 11 is transmitted to the modulator 12.

If an optical signal is received from the transmission line $B_R$ side before the transmission duration T of a data block elapses, then the second transmission direction maintaining signal generating circuit 16 detects the start bit. Consequently, the maintaining signal output from the circuit 16 is changed from the L level to the H level, but since the $\overline{Q}$-terminal output of the RS-type flip-flop circuit 155 remains at the L level, the output signal of the transmission direction changing over signal generating circuit 17 maintains the L level. Accordingly, there is no change from the operative condition of the receiver 11 and the inoperative condition of the driver 14. Due to such control, reception takes precedence over transmission to prevent electrical signals from interfering with each other in the half duplex transmission line A.

Subsequently, description will be given of the case wherein no electrical signal is received from the transmission line A side but an optical signal is received from the transmission line $B_R$ side. In this instance, the $\overline{Q}$-terminal output of the RS-type flip-flop circuit 155, that is, the output of the first transmission direction maintaining signal generating circuit 15 is at the H level. Meanwhile, the Q-terminal output of the RS-type flip-flop circuit 165, that is, the output of the second transmission direction maintaining signal generating circuit 16, normally presents the L level. Then, when a data signal is delivered from the demodulator 13, transition of the signal level from the H level to the L level is detected by the D-type flip-flop circuits 162 and 163. Consequently, the output of the AND gate 164 is changed from the L level to the H level to set the RS-type flip-flop circuit 165. As a result, the output of the AND gate 171 is also changed from the L level to the H level, by which the receiver 11 is put into an inoperative condition while the driver 14 is put into an operative condition. Such conditions are maintained until the transmission duration T of a data block is counted up by the timer 167 as described hereinabove. Accordingly, during the period of time T, data received from the transmission line $B_R$ side by way of the demodulator 13 are sent to the transmission line A side by way of the driver 14.

After the period of time T elapses, the timer 167 resets the RS-type flip-flop circuit 165 to change the output of the latter to the L level. Consequently, the output of the AND gate 171 is changed into the L state to enable initial reception by the receiver 11.

When data (start bits) are received simultaneously from the transmission line A and the transmission line $B_R$, the optical transmission device operates so that the transmission line A side may take precedence.

With the optical transmission device having such a construction as described above, the RS422 line forming the transmission line A is of the half duplex type, and transmission and reception of signals can be made over the single transmission line. Accordingly, the transmission line is simplified and improved in reliability.

Subsequently, another embodiment of the present invention will be described.

Figure 5:
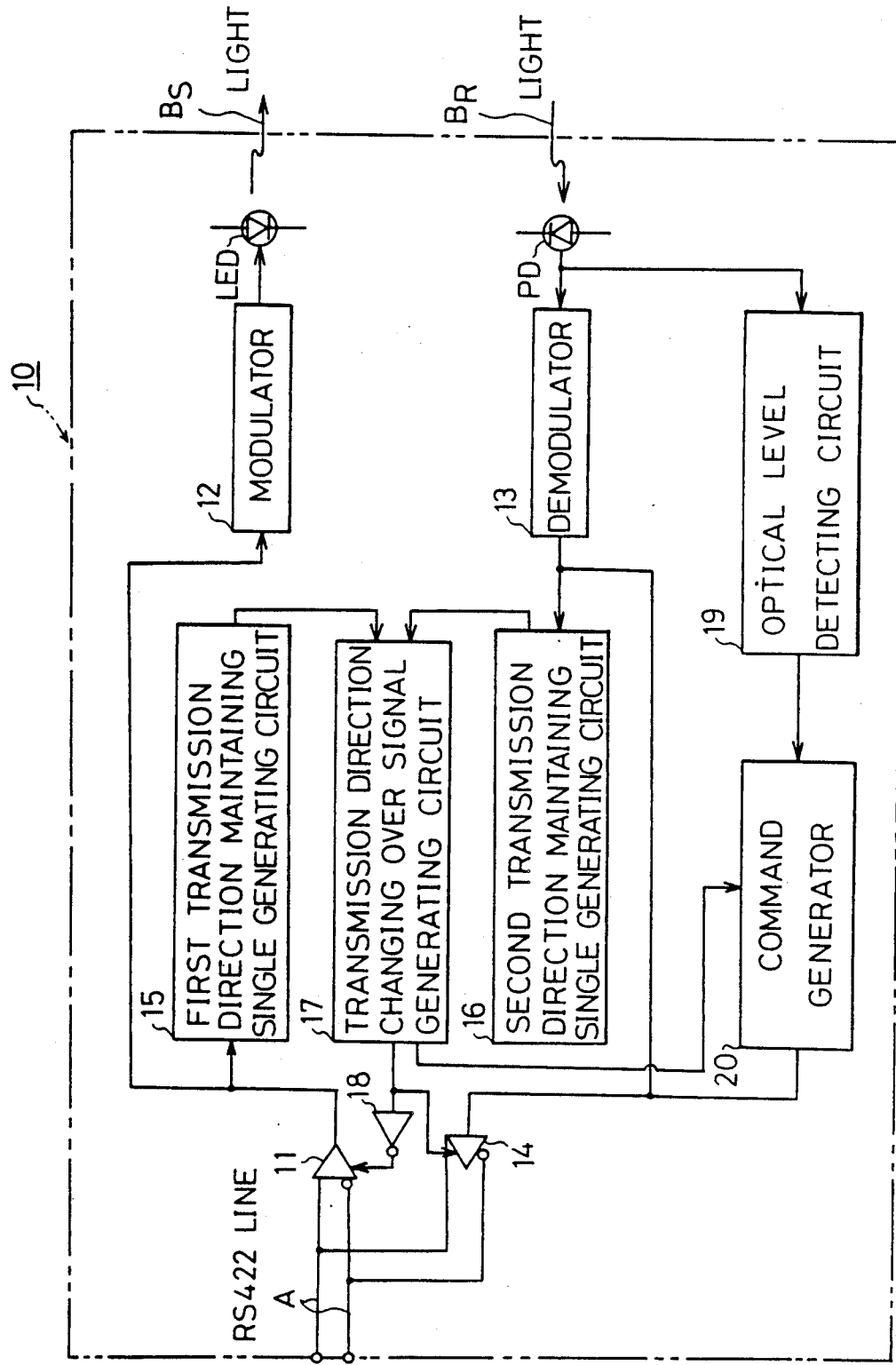
FIG. 5 is a block diagram showing construction of an optical transmission device according to another preferred embodiment of the present invention.

Construction of an entire optical transmission device according to the second embodiment is shown in FIG. 5. It is to be noted that blocks having like functions to those of FIG. 1 are denoted by like reference characters. The optical transmission device of the present embodiment has a generally similar construction to that of the optical transmission device of the preceding embodiment and is only different in that the second transmission direction maintaining signal generating circuit 16 includes additional circuits and an optical level detecting circuit 19 and a command generator 20 are provided additionally.

Figure 6:
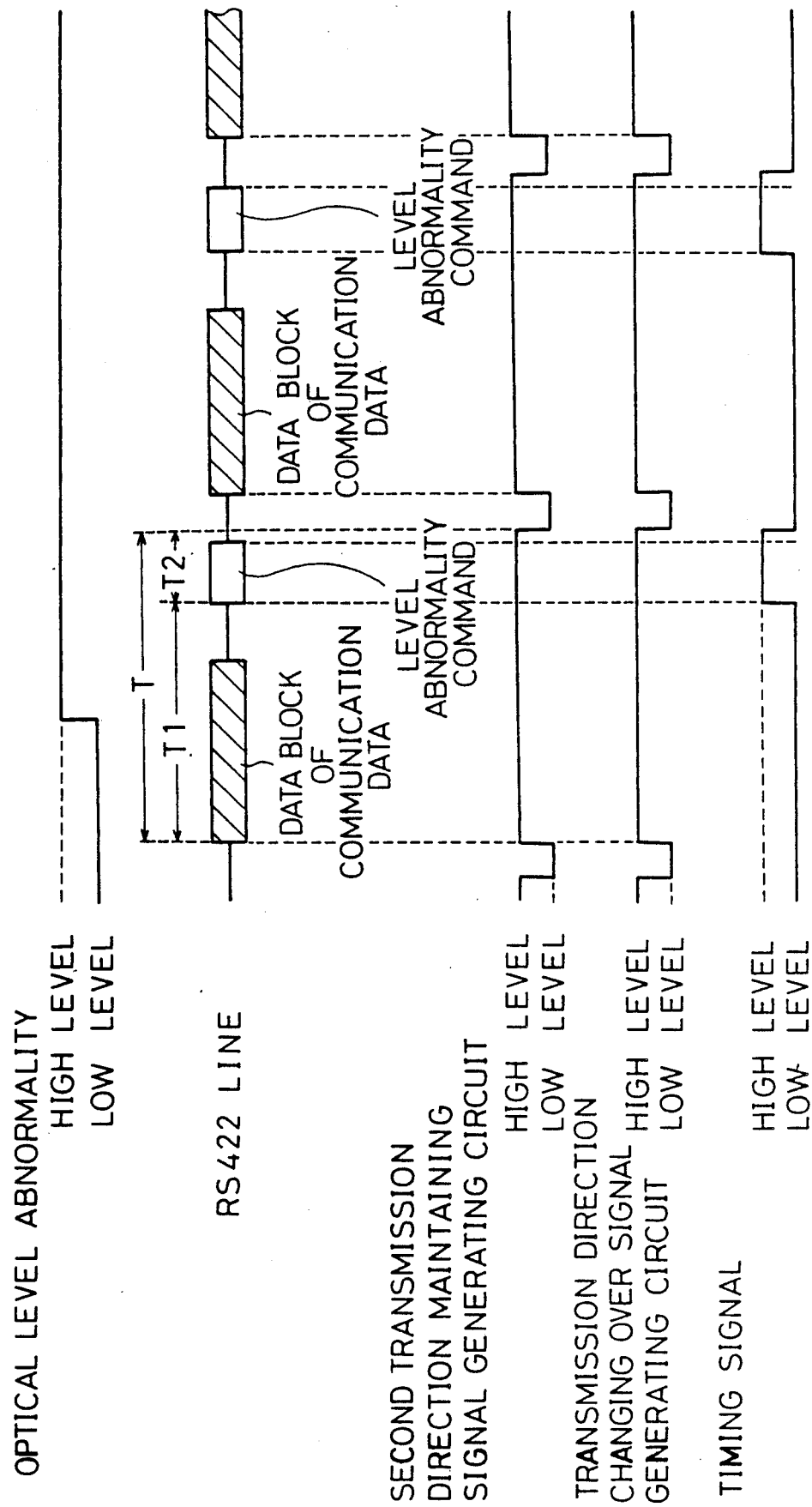
FIG. 6 is a diagram showing an arrangement of a data block and an abnormality command in an electrical signal to be transmitted by the optical transmission device of FIG 5.
Figure 7:
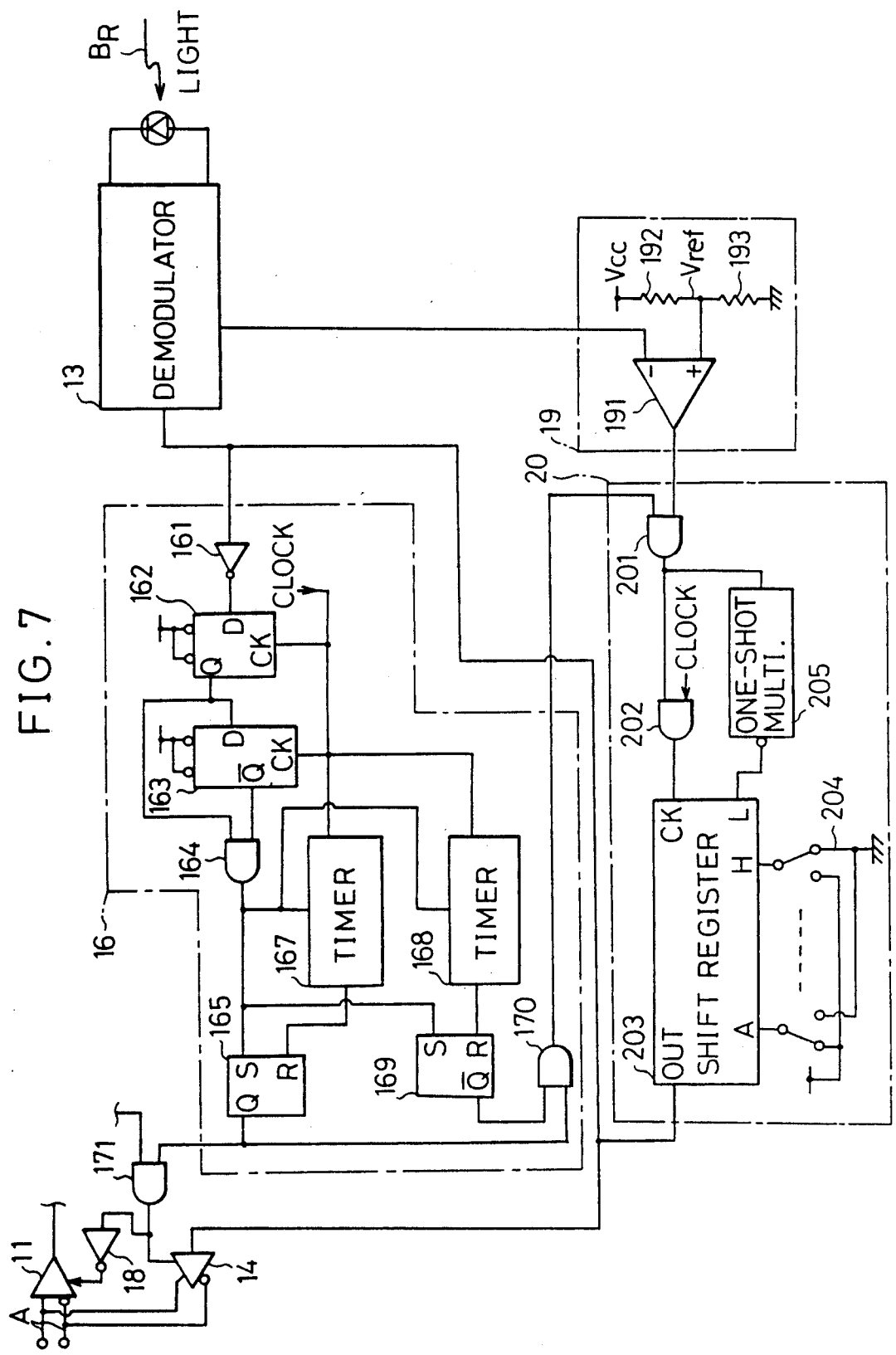
FIG. 7 is a detailed circuit diagram of the optical transmission device of FIG. 5.

Referring to FIG. 7 which shows detailed constructions of the optical transmission device of FIG. 5, the second transmission direction maintaining signal generating circuit 16 additionally includes a pair of timers 167 and 168 which start their counting operations in response to an output signal of the AND gate 164. Referring to FIG. 6, the period of time for measurement of the timer 167 is set to a value T of the sum of a transmission duration T1 of a data block and another following transmission duration T2 of an abnormality command. Meanwhile, the period of time for measurement of the timer 168 is set to the transmission duration T1 of a data block. Referring back to FIG. 7, since a maintaining signal output from the RS-type flip-flop circuit 165 is coupled to the AND gate 171, if data are received by way of the demodulator 13, then the driver 14 presents an operative condition and the receiver 11 presents an inoperative condition for the period of time T. Accordingly, transmission of a data block and command data can be made similarly as in the preceding embodiment.

An RS-type flip-flop circuit 169 is connected to be set by an output of the AND gate 164 and reset by an output of the timer 168. Accordingly, the $\overline{Q}$-terminal output of the RS-type flip-flop circuit 169 is changed from the H level to the L level when a start bit is detected but is changed to the H level when the transmission duration T1 of a data block elapses. Consequently, the output of an AND gate 170 is changed to the H level when the transmission duration T1 of a data block elapses and then to the L level after lapse of the transmission duration T2 of command data. The output signal of the AND gate 170 makes a timing signal which defines a timing at which an abnormality command is to be sent out. Thus, the period of time during which the output of the AND gate 170 presents the H level is T2.

Further, a comparator 191 is provided as the optical level detecting circuit 19. For the period of time T2, an AND gate 201 presents an output equal to the output of the comparator 191. The non-inverted input terminal of the comparator 191 is connected to receive a reference voltage Vref obtained by dividing a voltage Vcc by means of a pair of resistors 192 and 193 while the inverted input terminal of the comparator 191 is connected to receive a peak hold voltage which is an output of the demodulator 13. The peak hold voltage represents a level of an optical signal received by the demodulator 13.

Accordingly, if the optical signal level becomes lower than the reference voltage Vref, then the output of the AND gate 201 presents the H level for the period of time T2. On the other hand, another AND gate 202 delivers a clock signal to a shift register 203 while the output of the AND gate 201 remains at the H level. Further, at a timing when the output of the AND gate 201 changes from the L level to the H level, a one-shot multivibrator 205 is rendered operative, and an inverted differentiation signal is delivered from the multivibrator 205 to the load terminal of the shift register 203. At the timing, the shift register 203 loads therein data set by a switch device 204. After then, the thus set command data are given to the driver 14 in synchronism with a clock signal given thereto by way of the AND gate 202.

When the optical signal level becomes lower than the reference voltage Vref as seen in FIG. 6, in addition to normal communication data, a level abnormality command is transmitted succeeding to the communication data in this manner.

WHAT IS CLAIMED IS

1. An optical transmission device, comprising:
 a receiver for receiving an electrical signal propagated over a half duplex transmission line;
 an optical transmitting circuit for modulating the electrical signal received by said receiver, converting the thus modulated electrical signal into an optical signal, and transmitting the optical signal into an optical full duplex transmission line;
 an optical signal receiving circuit for receiving an optical signal propagated over said full duplex transmission line, converting the received optical signal into an electrical signal, and demodulating the electrical signal;
 a driver for transmitting the electrical signal given from said optical signal receiving circuit into said half duplex transmission line;
 a first transmission direction maintaining signal generating circuit for detecting a start bit of a data block of the electric signal received by said receiver and generating a maintaining signal to maintain the same transmission direction for a predetermined period of time during which at least the data block can be transmitted after such detection of the start bit;
 a second transmission direction maintaining signal generating circuit for detecting a start bit of a data block of the electric signal given from said optical signal receiving circuit and generating a maintaining signal to maintain the same transmission direction for a predetermined period of time during which at least the data block can be transmitted after such detection of the start bit; and
 a transmission direction changing over signal generating circuit responsive to the maintaining signals given from said first or second transmission direction maintaining signal generating circuit for transmitting to said driver and said receiver a changeover controlling signal to control passage or stopping of signals by said driver and said receiver to change over the transmission direction.

2. An optical transmission device according to claim 1, wherein, in an initial state of said optical transmission device, said receiver is in a signal passage enabling condition while said driver is in a signal passage disabling condition.

3. An optical transmission device according to claim 1, wherein said transmission direction changing over signal generating circuit continues to generate, while the maintaining signal continues to be given from said first transmission direction maintaining signal generating circuit, a signal to prevent said driver from being put into a signal passage enabling condition irrespective of an output signal of said second transmission direction maintaining signal generating circuit.

4. An optical transmission device according to claim 1, wherein said first transmission direction maintaining signal generating circuit continues to generate, until the start bit of the data block is detected, an enabling signal to enable said driver to be put into a signal passage enabling condition in response to an output signal from said second transmission direction maintaining signal generating circuit.

5. An optical transmission device according to claim 1, wherein said transmission direction changing over signal generating circuit continues to generate, when the maintaining signal is given from said second transmission direction maintaining signal generating circuit while the enabling signal continues to be given from said first transmission direction maintaining signal generating circuit, a change-over controlling signal to put said receiver into a signal passage disabling condition and said driver into a signal passage enabling condition only while the maintaining signal continues to be given.

6. An optical transmission device, comprising:
a receiver for receiving an electrical signal propagated over a half duplex transmission line;
an optical transmitting circuit for modulating the electrical signal received by said receiver, converting the thus modulated electrical signal into an optical signal, and transmitting the optical signal into an optical full duplex transmission line;
an optical signal receiving circuit for receiving an optical signal propagated over said full duplex transmission line, converting the received optical signal into an electrical signal, and demodulating the electrical signal;
a driver for transmitting the electrical signal given from said optical signal receiving circuit into said half duplex transmission line;
a first transmission direction maintaining signal generating circuit for detecting a start bit of a data block of the electric signal received by said receiver and generating a maintaining signal to maintain the same transmission direction for a predetermined period of time during which at least the data block can be transmitted after such detection of the start bit;
a second transmission direction maintaining signal generating circuit for detecting a start bit of a data block of the electric signal given from said optical signal receiving circuit and generating a maintaining signal to maintain the same transmission direction for a predetermined period of time during which at least the data block and an abnormality command to be sent succeeding to the data block can be transmitted after such detection of the start bit as well as a timing signal representative of a period of time during which the abnormality command can be transmitted after transmission of the data block;
a transmission direction changing over signal generating circuit responsive to the maintaining signals given from said first or second transmission direction maintaining signal generating circuit for transmitting to said driver and said receiver a changeover controlling signal to control passage or stopping of signals by said driver and said receiver to change over the transmission direction;
an optical level detecting circuit for comparing a level of the optical signal received by said optical signal receiving circuit with a predetermined reference level and for generating an optical level abnormality signal when the optical signal level is lower than the reference level; and
a command generator for delivering warning data to said driver in synchronism with the timing signal given from said second transmission direction maintaining signal generating circuit when the optical level abnormality signal continues to be given from said optical level detecting circuit.

7. An optical transmission device according to in claim 6, wherein said second transmission direction maintaining signal generating circuit detects, when the optical level abnormality signal is given from said optical level detecting circuit, a start bit of a data block of an electrical signal given from said optical signal receiving circuit and then generates, for the predetermined period of time during which at least the data block and the abnormality command to be sent succeeding to the data block can be transmitted after such detection of the start bit, a maintaining signal to maintain the same transmission direction and a timing signal representative of the period of time during which the abnormality command can be transmitted after transmission of the data block, but when the optical level abnormality signal is not given from said optical level detecting circuit, said second transmission direction maintaining signal generating circuit detects a start bit of a data block of an electrical signal given from said optical signal receiving circuit and generates a maintaining signal to maintain the same transmission direction for the predetermined period of time during which at least the data block can be transmitted after such detection of the start bit.

8. An optical transmission device according to claim 6, wherein, in an initial state of said optical transmission device, said receiver is in a signal passage enabling condition while said driver is in a signal passage disabling condition.

9. An optical transmission device according to claim 6, wherein said transmission direction changing over signal generating circuit continues to generate, while the maintaining signal continues to be given from said first transmission direction maintaining signal generating circuit, a signal to prevent said driver from being put into a signal passage enabling condition irrespective of an output signal of said second transmission direction maintaining signal generating circuit.

10. An optical transmission device according to claim 6, wherein said first transmission direction maintaining signal generating circuit continues to generate, until the start bit of the data block is detected, an enabling signal to enable said driver to be put into a signal passage enabling condition in response to an output signal from said second transmission direction maintaining signal generating circuit.

11. An optical transmission device according to claim 6, wherein said transmission direction changing over signal generating circuit continues to generate, when the maintaining signal is given from said second transmission direction maintaining signal generating circuit while the enabling signal continues to be given from said first transmission direction maintaining signal generating circuit, a change-over controlling signal to put said receiver into a signal passage disabling condition and said driver into a signal passage enabling condition only while the maintaining signal continues to be given.

* * * * *

UNITED STATES PATENT AND TRADEMARK OFFICE
CERTIFICATE OF CORRECTION

PATENT NO. : 4,996,683

DATED : February 26, 1991

INVENTOR(S) : Tsuyoshi Yamashita et al

It is certified that error appears in the above-identified patent and that said Letters Patent is hereby corrected as shown below:

On the title page assignee should read

--[73] Assignee: --Toyoda Koki Kabushiki Kaisha, Kariya;

Toyota Jidosha Kabushiki Kaisha, Toyota;

Hokuyo Automatic Co., Ltd., Osaka, Japan--.

Signed and Sealed this

First Day of December, 1992

Attest:

DOUGLAS B. COMER

*Attesting Officer*    *Acting Commissioner of Patents and Trademarks*